Dec. 16, 1969   L. A. STAPLES ET AL   3,483,634
SOUND GENERATOR
Filed April 10, 1967

INVENTOR.
LYNN A. STAPLES
&
ALEXANDER J. URQUHART

BY *William Grobman*

United States Patent Office 3,483,634
Patented Dec. 16, 1969

3,483,634
SOUND GENERATOR
Lynn A. Staples, Greene, and Alexander J. Urquhart, Binghamton, N.Y., assignors to Singer-General Precision, Inc., a corporation of Delaware
Filed Apr. 10, 1967, Ser. No. 629,501
Int. Cl. G09b 9/08; G08b 3/00
U.S. Cl. 35—12                                       9 Claims

ABSTRACT OF THE DISCLOSURE

Modern simulator trainers require realistic effects in all aspects of training. This disclosure describes and illustrates a system for generating those sounds which accompany the operation of a small aircraft. The sound generator comprises a white noise source, a square pulse generator and an appropriate amplifying and control means therefor. The white noise is mixed with the rectangular pulses to generate a composite sound under the control of throttle and air speed devices to produce a sound which simulates the engine of a small aircraft, the propeller of a small aircraft, and, when pertinent, the slip-stream of the aircraft.

---

This invention relates to a new and improved sound generator and, more particularly, to devices for generating realistic sounds to accompany simulator trainers.

Modern training devices require as many realtistic effects to accomplish appropriate training as possible. In fixed-base vehicle trainers, not only is appropriate motion and the sense of movement required to produce suitable habits in the trainee, but the noises which accompany the actual operation of the vehicle are also required to produce more plausible training environments. In the training of individuals to acquire basic flying skills, the noises generated by the vehicle itself are important to indicate to the trainee various conditions of operation of the vehicle. A satisfactory generator for producing noises which simulate the actual vehicle noises must include devices for varying the amplitude, the frequency, and the types of noise with each change in vehicle speed, attitude and position.

It is an object of this invention to provide a new and improved sound generator.

It is another object of this invention to provide a new and improved sound generator which generates sounds to simulate the appropriate sounds of a vehicle.

It is a further object of this invention to provide a new and improved sounds generator which generates sounds to simulate the actual vehicle operation and which includes appropriate controls to modify the generated sounds with changes in the simulated conditions of the vehicle.

Other objects and advantages of this invention will become more apparent as the following description proceeds, which description should be considered together with the accompanying drawings in which.

Figure 1:
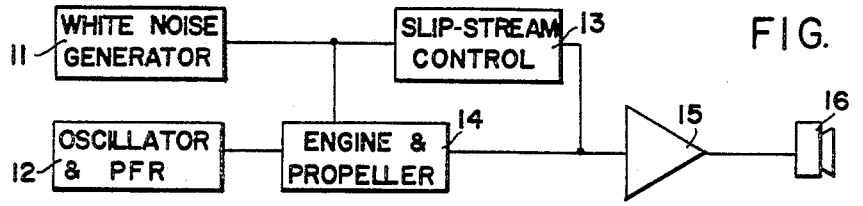
FIG. 1 is a block diagram of the noise generation system of this invention.

Referring now to the drawings in detail and more particularly to FIG. 1, the reference character 11 designates a white noise generator the output of which feeds an input to both a slip-stream control circuit 13 and an engine and propeller noise generator 14. The engine and propeller noise generator 14 has a second input from an oscillator and pulse former 12. The outputs of the engine and propeller noise generator 14 and the slip-stream control 13 are combined and applied as a single input to a power amplifier 15 which drives a suitable speaker 16.

Figure 2:
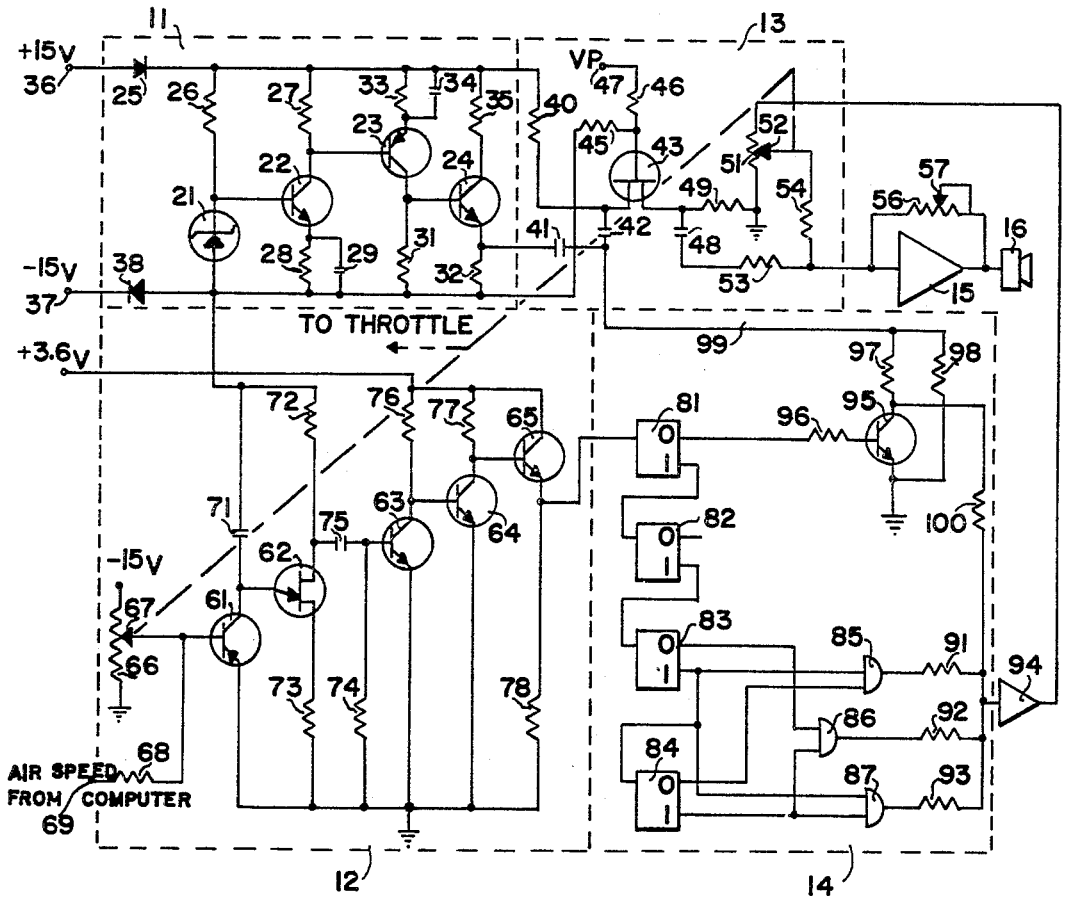
FIG. 2 is a schematic circuit diagram of the system of FIG. 1.

The system of FIG. 1 is shown in greater detail in FIG. 2 in which the blocks of FIG. 1 are set off by dashed lines and identified by the same reference characters. Thus, the white noise generator 11 comprises a noisy Zener diode 21 which has its cathode connected through a resistor 26 and a diode 25 to a terminal 36 to which is applied a source of positive potential, and its anode connected through a diode 38 to a terminal 37 to which is connected a source of negative potential. The junction between the cathode of the diode 21 and the resistor 26 is connected to the base electrode of a transistor 22 whose collector electrode is connected through a load resistor 27 to the diode 25 (B+), and whose emitter electrode is connected through a resistor 28 to the diode 38 (B−). A capacitor 29 is connected across the resistor 28. The output from the transistor 22 is taken across the resistor 27 and is applied to the base electrode of the transistor 23 whose emitter electrode is connected through a load resistor 33 to the diode 25 and whose collector electrode is connected through the load resistor 31 to the diode 38. A capacitor 34 is connected across the resistor 33. The output from the transistor 23 is taken across the load resistor 31 and is applied to the base electrode of a transistor 24 whose collector electrode is connected through a load resistor 35 to the diode 25 and whose emitter electrode is connected through a load resistor 32 to the diode 38. The output of the transistor 24 is taken across the load resistor 32 and is applied through a capacitor 41 and a capacitor 42 to the drain electrode of a field effect transistor 43 whose source electrode is connected through a resistor 49 to ground. The gate electrode of the FET 43 is connected through a resistor 45 to the diode 38, and also through a resistor 46 to a terminal 47 to which a potential representative of the air speed VP is applied, and the drain electrode is connected through a resistor 40 to the diode 25. The output from the field effect transistor 43 is taken across the load resistor 49 and is applied through a capacitor 48 and a resistor 53 to the input of a power amplifier 15. The output of the amplifier 15 drives a loud speaker 16. A potentiometer 56 having a slide contact 57 is connected across the amplifier 15 as a gain control. The oscillator and pulse former circuit 12 comprises a relaxation oscillator formed by a transistor 61 having a capacitor 71 connected between its collector electrode and a source of negative potential at the diode 38. The emitter electrode of the transistor 61 is grounded, and the base electrode of the transistor 61 is connected through a slide contact 67 to a potentiometer 66 which is connected between a source of negative potential and ground. The base electrode of the transistor 61 is also connected through a resistor 68 to a terminal 69 to which is applied a potential representative of the speed of the vehicle, which potential may originate in the computer. The junction between the capacitor 71 and the collector electrode of the transistor 61 is applied to the emitter electrode of the unijunction transistor 62. One base electrode of a transistor 62 is connected through a resistor 72 to the diode 38, and the other base electrode is connected through a resistor 73 to ground. The output from the transistor 62 is taken across the resistor 72 and is applied through a coupling capacitor 75 and across a resistor 74 to the base electrode of a transistor 63. The emitter electrode of the transistor 63 is grounded and the collector electrode is connected through a load resistor 76 to the diode 38. The output of the transistor 63 is taken across the load resistor 76 and applied to the base electrode of a transistor 64 whose collector electrode is connected through a load resistor 77 to the diode 38 and whose emitter electrode is grounded. The junction between the load resistor 77 and the collector electrode of transistor 64 is connected to the base electrode of a transistor 65 whose collector electrode is directly connected to the diode 38 and whose emitter electrode is connected through a resistor 78 to ground. The output from the transistor 65 is taken across the resistor 78 and is applied to the input of a first binary counter 81. The engine and propeller noise generator 14 comprises four binary counters connected as a stepping register. Each binary counter 81, 82, 83 and 84 has a zero output and a one output. The one output of the counter 81 is applied to the input of the counter 82. The one output of the counter 82 is connected to the input of the counter 83 and the one output of the counter 83 is connected to the input of the counter 84. In addition, three output gates 85, 86 and 87 are provided. Each of the gates 85, 86 and 87 has a pair of inputs. The two inputs to the gate 85 are from the one output of the counter 83 and the zero output of the counter 84. The two inputs to the gate 86 are from the zero output of the counter 83 and the one output of the counter 84. The two inputs to the gate 87 are from the one output of the gate 83 and the one output of the gate 84. The outputs from the gates 85, 86 and 87 are applied through scaled resistors 91, 92 and 93 respectively to a common output line from which they are applied to the inputs of an amplifier 94. The output of the amplifier 94 is applied to one side of a potentiometer 51 having a slide contact 52 which is connected through a resistor 54 to the input of the power amplifier 15. The potentiometers 51 and 66 are mechanically ganged to operate together. In addition, a transistor 95 has its base electrode connected through a resistor 96 to the zero output of the binary counter 81. The collector electrode of the transistor 95 is connected through a resistor 100 to the input line to the amplifier 94 which is also connected to the capacitor 41 in the output of the white noise generator 11. A resistor 98 is connected across the output line and ground to which the emitter electrode of the transistor 95 is also connected.

The operation of this system depends upon the appropriate combination of signals from the white noise generator 11 and the oscillator 12. The white noise generator 11 uses a noisy diode 21 as the source of its random noise. The output from the diode 21 is amplified through the cascaded transistors 22, 23 and 24 to produce a white noise signal output at the coupling capacitor 41. The diode 21 and the three transistors are connected across a source of potential connected to the terminals 36 and 37. Of course, the circuitry shown in FIG. 2 for the white noise generator is but one of many possible configurations that a generator of this type may assume. The output of the white noise generator is applied through the coupling capacitor 41 to a line 99 which serves as the input to the amplifier 94. In adition, the output from the white noise generator is applied across the field effect transistor 43. When the amplitude of the air speed signal VP applied to the input terminal 47 and through the resistor 46 to the gate electrode of the FET 43 reaches a sufficiently high value, the FET 43 begins to conduct and white noise is applied from the output capacitor 41 through the transistor 43 and across the resistor 49 to the input of the power amplifier 15. This serves to generate the sound of the slip-stream but only when the speed of the aircraft reaches a sufficiently high value for the slip-stream noise to become apparent. This may occur, for example, in small aviation trainers when the simulated speed of the aircraft reaches approximately 90 to 100 miles an hour. At lower speeds the air flow past the fuselage is too low to generate the volume of sound necessary to overcome the other environmental noises and makes itself heard.

The oscillator and pulse former circuit 12 is connected between a source of negative potential connected to the terminal 37 and ground. The oscillator comprises a relaxation oscillator which includes the capacitor 71 charging through the transistor 61 and discharging through the unijunction transistor 62. The rate at which the capacitor 71 charges is determined by the potential applied to the base electrode of the transistor 61 and by the subsequent conduction through that transistor. The voltage applied to the base electrode of the transistor 61 is determined by two things: by the setting of the slide contact 67 of the potentiometer 66 across which a source of potential is applied and also by the potential supplied from the appropriate instrument in the trainer representative of air speed. The air speed potential may be derived from the flight computer, for example, and applied to the terminal 69. The greater the conduction through the transistor 61, the more rapidly the capacitor 71 will charge to a value where the unijunction transistor 62 is gated on. Once the unijunction transistor 62 begins conducting, the capacitor 71 discharges through the series arrangements of the resistor 72, the unijunction transistor 62, the resistor 73, and the transistor 61. When the capacitor 71 has discharged to a sufficiently low value, the unijunction transistor 62 ceases to conduct and the capacitor 71 again begins charging. Thus, the process repeats itself, generating pulses. These pulses are applied to the clipping amplifiers represented by the three cascaded transistors 63, 64 and 65. The output from the transistor 65 represents a series of squared pulses which is applied to the input of the binary counter 81.

The arrangement of the four binary counters 81, 82, 83 and 84 forms a stepping register in which the input pulses applied to the input of the binary counter 81 are stepped down through the other counters. An input pulse applied to a counter input will place it in a first stable state, and a second pulse applied to that same input will cause the circuit to change to its other stable state. Thus, subsequent pulses applied to the single input of a binary counter will cause it to repeatedly change its condition. When a binary counter is in one of its two stable conditions, one of its outputs has a high voltage and the other has a low voltage. When the counter is switched to its other stable state, the potentials on the two outputs also switch. The two outputs of a binary counter are usually identified as the zero output and the one output, and the signal out is determined by which of the two outputs has the high voltage. When a pulse is applied to the input to the binary counter 81, it changes its state and, for this discussion, let it be assumed that the zero output becomes high. On the next input pulse to the binary counter 81, the zero output goes low and the one output goes high, applying a positive-going pulse to the input to the binary counter 82. Two more pulses applied to the input of the counter 81 causes the counter 82 to again change state, applying a pulse to the counter 83. The end result is that a chain of binary counters such as 81–84 produces output pulses at a rate which is much less than the input pulse rate. The outputs from the counters 83 and 84 are applied to three gates 85, 86 and 87. These gates are so arranged that they will apply pulses to their output resistors when their input potentials are both low. Thus, when the zero output of binary counter 83 is low, low potential signals are applied to the input to the gate 86. The gate 86 opens only when the one output of the gate 84 is also low. Assuming that the zero output of gate 83 is low for every other input pulse to that gate, and that the one output from the gate 84 is low once for every other input pulse applied to that gate, or once for every fourth pulse applied to the input to gate 83, then it becomes apparent that the gate 86 opens only once for every fourth input pulse applied to the binary counter 83. When the one output from the counter 83 is low, then a low signal is applied to the inputs to gates 85 and 87. The other input to gate 85 is applied from the zero output from counter 84, and the other input to gate 87 is applied from the one output of counter 84. Assuming a sequence of pulses applied to the input to the counter 83, the zero output of counter 83 goes low. One input to gate 86 is low, but since the other input is high, gate 86 is closed. No other gate has two low inputs. The next pulse applied to the counter 83 drives that counter into its one condition, and the one output from this counter now becomes low applying a low signal simultaneously to the inputs of both gate 85 and 87. Since the counter 84 is also in the zero state, the other input to the counter 85 has a low potential and a pulse passes through the counter 85 and the resistor 91 to be applied to the output amplifier 94. The next pulse input to the counter 83 drives the counter 83 back into its zero state and the change in the output of the counter 83 applies an input pulse to the counter 84 driving that counter into its one state. This places two low potentials on the inputs to the gate 86 permitting a pulse to pass through that gate and the resistor 92 to be applied to the input of the amplifier 94. A third pulse applied to the input of the counter 83 drives counter 83 into its one state again, applying a low input to the gate 87. Since the counter 84 is in the one state, the gate 87 has two low inputs, and a pulse passes therethrough to be applied through resistor 93 to the input of the amplifier 94. If it is assumed, as was stated above, that the resistors 91, 92 and 93 are scaled so that the resistor 91 has the highest value, and the resistor 93 has the lowest value, then the three pulses applied to the input of the amplifier 94 are of gradually increasing amplitude. The next pulse applied to the input of the counter 83 drives that counter to the zero state and applies a low input to the gate 86 which also receives a low input from the one output of the counter 84. This applies a medium amplitude pulse through the resistor 92 to the input of the amplifier 94. The next pulse applied to the input of the counter 83 drives the counter 83 to its one state and also drives the counter 84 to its zero state applying two low inputs to the gate 85 and causing a low amplitude pulse to pass through the resistor 91 to the input of the amplifier 94. Since the next pulse applied to the input to the counter 83 drives the counter 83 into its zero condition and leaves counter 84 in its zero condition, there is no output from any of the three gates 85, 86 or 87 and a space between output pulses occurs. Thus, the input to the amplifier 94 has applied to it a signal which comprises a stepped pulse of first ascending potential with a space between input pulses when the descending potential reaches its low value. While this process is being carried out through the gates 85, 86 and 87, the pulses applied to the binary counter 81 from the pulse former 12 produce an output from the counter 81 for every other input pulse applied. Thus, output pulses are applied through the resistor 96 to the base electrode of the transistor 95 causing that transistor to turn on. When the transistor 95 becomes conductive, it presents a low impedance conduction path through the series resistor 97 from the line 99 to ground. The line 99 is the line which carries the white noise generated by the white noise generator 11 and serves as the input to the amplifier 94. Thus, for every other pulse generated in the oscillator 12, the line 99 is effectively shorted out. The result of this is to apply a chopped white noise to the input of the amplifier 94. At the same time, the input to the amplifier 94 is receiving the stepped pulses being generated in the gates 85, 86 and 87. The composition input to the amplifier 94 is a stepped pulse and intermittent white noise. When this signal is amplified and applied to a speaker, each corner of the stepped pulse (wherever that stepped pulse produces a sudden change in direction or amplitude) produces a popping sound in the loud speaker. This can be considered the equivalent (and it sounds like it) of a single explosion in an internal combustion engine. Another way of looking at it is to call each of the corners of the stepped pulses the firing of a spark plug in the engine being simulated. The engine simulated by the outputs from the gates 85, 86, and 87 is, therefore, a four-cylinder engine. Cylinders may be added and subtracted as desired. The chopped white noise, which occurs at about the same time that the pulses from the gates 85, 86 and 87 occur, creates a propeller sound. The propeller noise is essentially white noise which is interrupted as the propeller passes an object. Similarly, slipstream noise, that of air rushing by the airplane itself, is essentially white noise. The white noise generator 11 therefore generates wind or air noises. This is applied to the power amplifier 15 and the speaker 16 whenever the simulated speed of the aircraft becomes sufficiently high to produce the sound of air rushing by the cabin. The same white noise is applied to the power amplifier 15 and the speaker 16 to represent the propeller blades passing through the air whenever a propeller blade passes by the listener, and is determined by the number of blades on the propeller and by the speed of rotation of the propeller. Also, the frequency at which the combustion produced in the engine occurs depends on the speed of rotation of the motor. For this reason the input to the oscillator, which input determines the frequency of oscillation, comes from the throttle setting represented by the position of the slide contact 67 on the potentiometer 66 and also from the computer as a voltage which represents air speed applied to the terminal 69. Changes in the output frequency of the oscillator 12 produces simultaneous changes in the frequency of the engine sound and of the propeller sound. In addition, not only does the frequency with which the noises produced by the engine and propeller increase with the throttle settings, but so, also, does the amplitude of these sounds increase. This amplitude is controlled by the position of the slide contact 52 on the potentiometer 51, which controls the gain or amplitude of the engine and propeller noises applied to the input of the power amplifier 15, but also by the position of the slide contact 57 on the potentiometer 56 which is a gain control for the power amplifier 15.

The above specification has described and illustrated a new and improved all-electric device for simulating those noises which add to the plausibility of the simulation in vehicle trainers. It is realized that the above description may indicate to others who are skilled in this art additional ways in which the principles of this invention may be utilized without departing from its spirit. It is, therefore, intended that this invention be limited only by the scope of the appended claims.

We claim:

1. Apparatus for electronically simulating a plurality of sounds normally generated by a moving vehicle at different speeds, said apparatus comprising a variable frequency oscillator for generating electrical pulses, means for arranging the pulse output of said oscillator in trains of pulses to simulate the noise of a vehicle engine, the number of pulses in a train being proportional to the number of cylinders in the engine being simulated, a device for converting electrical signals into sound signals, means for connecting said arranging means to said conversion means so that each change in value of said pulses causes said conversion means to generate a sound burst thus simulating the sound of a vehicle engine, means for generating random electrical signals, gate means connected to the output of said random signal generator, means for connecting the output of said gate means to said conversion means, and means for connecting an input of said gate means to the output from said oscillator to cause said gate means to open and close in synchronism with said pulses to pass said random electrical signals to said conversion means in a pulse pattern so that said conversion means additionally generates sounds simulating recurring air flow beats such as produced by rotating propellers.

2. The apparatus defined in claim 1 further including means for simulating the speed control of a vehicle, means connected to said speed control simulator for generating an electrical signal whose amplitude is proportional to the speed control setting, and means for applying said speed control electrical signal to said variable frequency oscillator for controlling the frequency of the pulses generated thereby in accordance with the setting of the speed control simulator.

3. The apparatus defined in claim 2 further including an electrically controlled switch means, means for connecting said switch means directly between the output of said random signal generator and the input to said conversion means, and means for applying said speed control electrical signal to said switch means, said switch means being opened by said speed control signal when the simulated speed control signal is greater than a prescribed amount to generate random sound representative of wind noise at the higher simulated speeds.

4. A system for simulating the sounds of an internal combustion engine, said system comprising a variable frequency oscillator for generating electrical pulses, means for assembling said pulses into groups, each group comprising one pulse for each cylinder in the engine being simulated, means for combining the amplitudes of the pulses in each group into a single stepped pulse, means for converting electrical signals into sound, and means for applying said stepped pulses to said conversion means so that each sudden change in amplitude of said stepped pulses causes said conversion means to generate a burst of sound.

5. The sound generator defined in claim 4 wherein said pulse assembling means comprises a plurality of cascaded binary counters, each of said counters having an input and two outputs, means for applying the output pulses from said oscillator to the input of the first of said binary counters, means for connecting one output from each of said counters to the input of the next counter, a plurality of gates, each gate having an output and two inputs which must be simultaneously energized to produce energization at the output, means for connecting the two inputs of each gate to outputs from different counters so that only one gate is opened for any pulse output from said oscillator, and means for connecting the outputs of the individual gates to said amplitude modifying means.

6. The sound generator defined in claim 5 wherein said amplitude modifying means comprises a plurality of electrical impedances each of which has a value different from that of each other, and means for connecting said impedances individually in series with the outputs of the individual gates so that the amplitudes of the pulse outputs of the individual gates are modified differently.

7. The sound generator defined in claim 6 further including a source of random electrical signals, means for connecting together the ends of said impedances remote from said gates, means for connecting the output from said random generator to the common connection of said impedances, and means connected to the output from said random generator for periodically interrupting the random signal output from said generator.

8. The sound generator defined in claim 7 wherein said interrupting means comprises a first electronic switch connected across the output from said random generator, and means for connecting the other output from said first counter to said electronic switch to cause said switch to open and close as the potential on the other output from the first counter changes from one state to another.

9. The sound generator defined in claim 8 further including a second switch, means for connecting one side of said second switch to the output of said random signal generator, means for connecting the other side of said second switch to the input to said conversion means, and means connected to said second switch and to said simulated throttle control to close said second switch and apply said random signals to said conversion means when said simulated throttle control reaches a prescribed condition.

References Cited

UNITED STATES PATENTS

| | | | |
|---|---|---|---|
| 2,898,587 | 8/1959 | Nye | 35—12 X |
| 2,974,424 | 3/1961 | Roberts | 35—12 |
| 3,057,083 | 10/1962 | Franck | 35—12 |

EUGENE R. CAPOZIO, Primary Examiner

P. V. WILLIAMS, Assistant Examiner

U.S. Cl. X.R.

340—384